United States Patent
Sekiya (10) Patent No.: US 10,250,840 B2
(45) Date of Patent: Apr. 2, 2019

(54) PROJECTION APPARATUS AND CONTROL METHOD THEREFOR

(71) Applicant: CANON KABUSHIKI KAISHA, Tokyo (JP)

(72) Inventor: Shinnosuke Sekiya, London (GB)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 15/860,995

(22) Filed: Jan. 3, 2018

(65) Prior Publication Data

US 2018/0199005 A1 Jul. 12, 2018

(30) Foreign Application Priority Data

Jan. 10, 2017 (JP) .................. 2017-001617

(51) Int. Cl.
| | | |
|---|---|---|
| G03B 21/14 | (2006.01) | |
| H04N 9/31 | (2006.01) | |
| H04N 5/74 | (2006.01) | |
| G09G 5/36 | (2006.01) | |

(52) U.S. Cl.
CPC ............ *H04N 5/74* (2013.01); *G03B 21/147* (2013.01); *G09G 5/36* (2013.01); *H04N 9/3185* (2013.01)

(58) Field of Classification Search
CPC .... G03B 21/14; G03B 21/147; G03B 21/142; H04N 9/3185; H04N 9/317

USPC ...................................... 353/69, 70
See application file for complete search history.

(56) References Cited

U.S. PATENT DOCUMENTS

2013/0083058 A1* 4/2013 Yoshimura ............... H04N 5/74
345/629

FOREIGN PATENT DOCUMENTS

| JP | 2013-077988 A | 4/2013 |
|---|---|---|
| JP | 2013-078001 A | 4/2013 |

* cited by examiner

*Primary Examiner* — Ryan D Howard
(74) *Attorney, Agent, or Firm* — Canon USA Inc., IP Division (57) ABSTRACT

A projection apparatus includes a projection unit configured to project an image, an operation receiving unit configured to receive an operation, and a control unit configured to control the projection unit. The control unit controls the projection unit to project a first adjustment image for selecting a position to be subjected to an adjustment of the image to be projected by the projection unit. When the operation receiving unit receives an operation for determining the adjustment target position while the projection unit is projecting the first adjustment image, the control unit controls the projection unit to project a second adjustment image different from the first adjustment image in an area corresponding to the adjustment target position identified by the determination operation received by the operation receiving unit.

14 Claims, 10 Drawing Sheets

PROJECTION APPARATUS AND CONTROL METHOD THEREFOR

BACKGROUND OF THE INVENTION

Field of the Invention

Embodiments of the present invention relate to a projection apparatus for projecting an image and a control method for a projection apparatus.

Description of Related Art

A conventional projection apparatus is known to move a plurality of adjustment control points and geometrically correct an image based on positions of the adjustment control points after movement. Japanese Patent Application Laid-Open No. 2013-78001 discusses a projection apparatus for dividing an image into a plurality of quadrangular areas, moving one vertex of each divided rectangle, and correcting projection positions of the image so that the image fits into the quadrangular areas after movement.

A conventional projection apparatus displays a grid chart on the foreground of a projection screen to indicate positions of adjustment control points. A grid chart may be useful when a user selects a position to be subjected to adjustment of an image projection position. However, if a grid chart is displayed when the position of an adjustment control point is adjusted, for example, it becomes hard for a user to visually recognize the adjustment control point because of the luminescence of the grid chart portion. More specifically, if a chart used for selecting a position to be subjected to image adjustment is also used at the time of adjustment, the user may find it hard to perform image adjustment because the grid chart may hinder the user's ability to accurately correct the projection positions of the image.

SUMMARY OF THE INVENTION

Embodiments of the present, invention are directed to improving the image adjustment in a projection apparatus.

According to an aspect of the present invention, a projection apparatus includes a projection unit configured to project an image, an operation receiving unit configured to receive an operation, and a control unit configured to control the projection unit. The control unit controls the projection unit to project a first adjustment image for selecting a position to be subjected to an adjustment of the image to be projected by the projection unit. When the operation receiving unit receives an operation for determining the adjustment target position while the projection unit is projecting the first adjustment image, the control unit controls the projection unit to project a second adjustment image different from the first adjustment image in an area corresponding to the adjustment target position identified by the determination operation received by the operation receiving unit.

According to another aspect of the present invention, a control method for a projection apparatus includes controlling a projection unit to project a first adjustment image for selecting a position to be subjected to an adjustment of an image to be projected by the projection unit, receiving an operation for determining the adjustment target position while the projection unit is projecting the first adjustment image, and controlling the projection unit, upon reception of the determination operation, to project a second adjustment image different from the first adjustment image in an area corresponding to the adjustment target position.

Further features of the present invention will become apparent from the following description of exemplary embodiments with reference to the attached drawings.

DESCRIPTION OF THE EMBODIMENTS

[Overview of Projection Apparatus 100]

Figure 1:
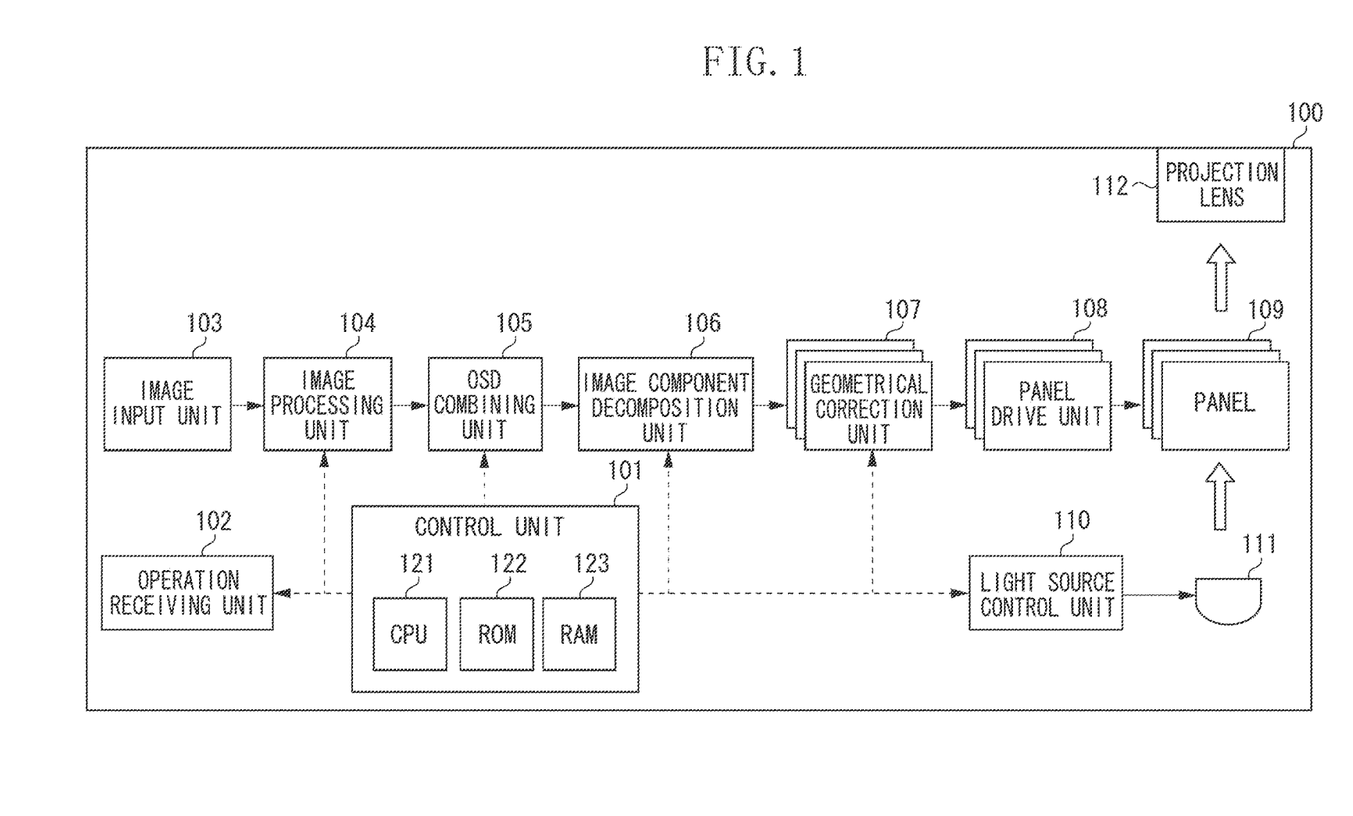
FIG. 1 illustrates a configuration of projection apparatus according to a first exemplary embodiment.

FIG. 1 illustrates a configuration of a projection apparatus 100 according to a first exemplary embodiment. The projection apparatus 100 is, for example, a projector for projecting on a screen an image input from a computer or a storage medium.

The projection apparatus 100 includes a control unit 101, an operation receiving unit 102, an image input unit 103, an image processing unit 104, an On Screen Display (OSD) combining unit 105, an image component decomposition unit 106, geometrical correction units 107, panel drive units 108, panels 109, a light source control unit 110, a light source 111, and a projection lens 112. The projection apparatus 100 includes a plurality or geometrical correction units 107, a plurality of panel drive units 108, and a plurality of panels 109 corresponding to a plurality of colors (for example, red, green, and blue). Under the control of the control unit 101, the panels 109 perform optical modulation on light emitted from the light source 111 to convert the light into image light. The projection apparatus 100 projects the image light from the projection lens 112 to project (display) an image. The panels 109, the light source 111, and the projection lens 112 configure a projection unit.

If the projection apparatus 100 includes a plurality of the panels 109, differences in physical attachment positions of the plurality of panels 109 may cause pixel deviation, and chromatic aberration of optical systems corresponding to the plurality of panes 109 may cause deviation of the position to be subjected to image projection for each color component. For each color component, the projection apparatus 100 projects an adjustment image for finely adjusting the projection position of the pixel selected by the user. The projection apparatus 100 sequentially projects a first adjustment image suitable for selecting a pixel to be subjected to adjustment of a projection position, and a second adjustment image suitable adjusting the projection position of the selected pixel.

By using the first adjustment image, the user can select the position of a pixel to be subjected to adjustment of the projection position. Then, by using the second adjustment image, the user can move (adjust) the projection position of the selected pixel, for example, in units of 0.1 pixels. The first and the second adjustment images will be described in detail below.

Figure 2:
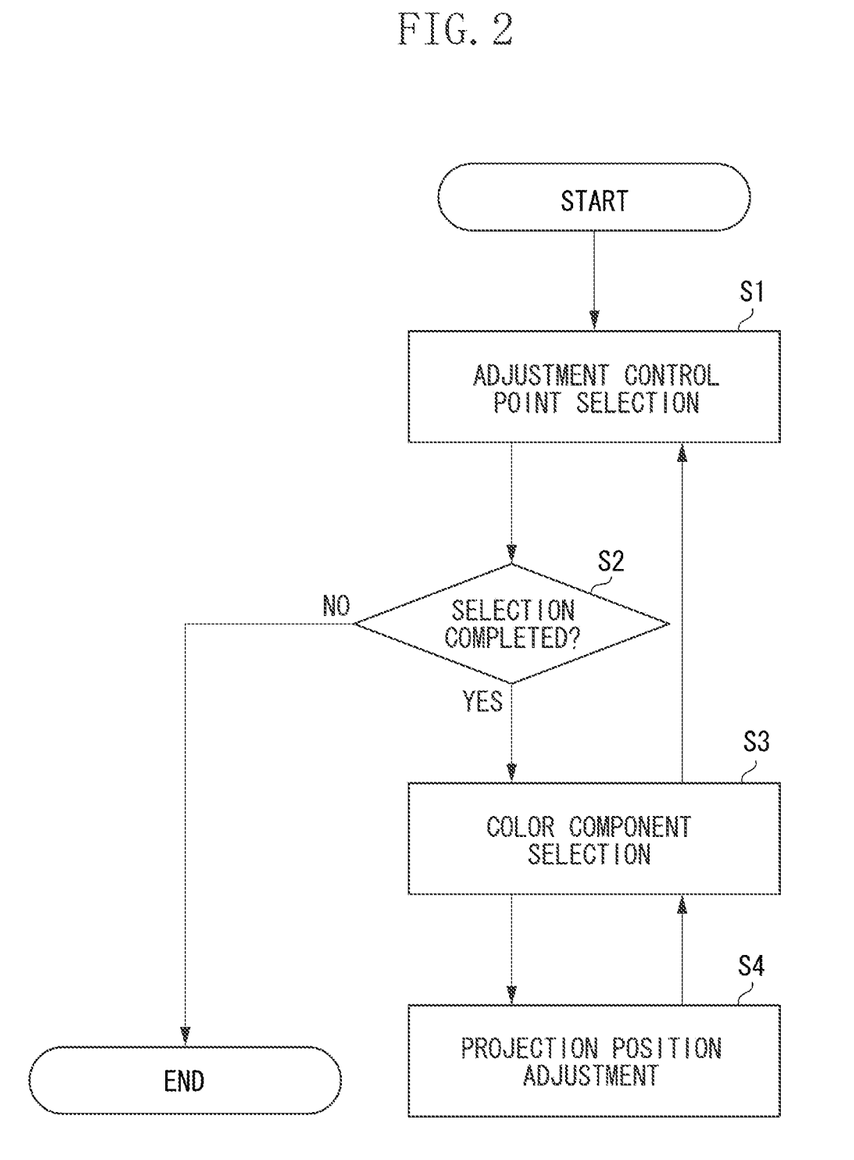
FIG. 2 is a flowchart illustrating basic operations of the projection apparatus.

FIG. 2 is a flowchart illustrating operations of the projection apparatus 100. In response to a user operation, the projection apparatus 100 can perform a position adjustment mode operation for adjusting the position to be subjected to image projection for each color component. When the position adjustment mode is activated (START), then in step S1, the projection apparatus 100 projects the first adjustment image and receives selection of an adjustment control point for specifying the position of a pixel to be adjusted. Then, the processing proceeds to step S2.

In step S2, the projection apparatus 100 determines whether completion of selection of an adjustment control point is received when the first adjustment image is projected. When the operation indicating completion of selection is received (YES in step S2), the processing proceeds to step S3. In step S3, the projection apparatus 100 projects a color component selection screen for selecting an adjustment target color component. When an adjustment target color component is selected in the color component selection screen, the processing advances to S4. Then in step S4, the projection apparatus 100 projects a second adjustment image for adjusting the projection position of the pixel at the adjustment control point selected in step S1. By using the projected second adjustment image, the user can correct color shift by moving the projection position of the pixel of the color component selected in step S3.

On the other hand, when an operation for ending the adjustment is received instead of an operation for completing a selection of an adjustment control point (NO in step S2), the projection apparatus 100 ends the adjustment processing. The projection apparatus 100 shifts from the image projection position adjustment state illustrated in step S4 to the color component selection screen illustrated in step S3, and then shifts from the color component selection screen to a screen in which the first adjustment image is projected in step S1. The process iteratively repeated, as necessary, until an operation for completing the selection of an adjustment control point is received (NO in step S2).

[Functional Configuration of Projection Apparatus 100]

The configuration of each unit of the projection apparatus 100 will be described in detail below.

The control unit 101 functions as a projection control unit for controlling each unit of the projection apparatus 100. The control unit 101 includes one or more processors operatively connected to one or more memories, such as a central processing unit (CPU) 121, a read only memory (ROM) 122, and a random access memory (RAM) 123. The CPU 121 performs various hinds of processing by executing programs stored in the ROM 122. In addition to programs to be executed by the CPU 121, the ROM 122 stores the first and the second adjustment images to be projected by the panels 109 in a mode for adjusting the image projection position.

The control unit 101 controls the geometrical correction units 107 and the panel drive units 108 to form the first adjustment image for selecting a position to be subjected to projected-image adjustment on the panels 109 as an optical modulation image. When the operation receiving unit 102 receives an operation for determining an adjustment target position in a state where the first adjustment image is projected, the control unit 101 controls the geometrical correction units 107 and the panel drive units 108 to form a second adjustment image different from the first adjustment image on the panels 109 as an optical modulation image.

The operation receiving unit 102 has a function of receiving a user operation. The operation receiving unit 102 receives a user operation, for example, via a device such as a remote control and a keypad. The operation receiving unit 102 may include a communication interface such as a local area network (LAW controller to receive a user operation via a communication line.

The operation receiving unit 102 receives selection of an adjustment target position and moving of the projection position of the pixel at the selected adjustment target position. Upon reception of determining an adjustment target position, the operation receiving unit 102 receives selection of whether to project the second adjustment image stored in the ROM 122 or to project an image input from outside with the second adjustment image superimposed thereon. The operation receiving unit 102 also receives an operation for determining an adjustment target position while the panels 109 are forming the first adjustment image or an image input from outside.

The image input unit 103 includes an interface for receiving an input of an image signal from an external apparatus. The image input unit 103 includes, for example, a High-Definition Multimedia Interface (HDMI, registered trademark).

Based on an instruction of the control unit 101, the image processing unit 104 performs predetermined image processing on the image signal input to the image input unit 103. The image processing unit 104 performs image processing for changing the brightness and contrast on the image.

Based on an instruction of the control unit 101, the On Screen Display (OSD) combining unit 105 performs combining processing for superimposing an image such as a menu screen onto the image having undergone the image processing by the image processing unit 104. The OSD combining unit 105 inputs the image having undergone the combining processing to the image component decomposition unit 106.

The image component decomposition unit 106 decomposes the image input from the OSD combining unit 105 into image components of a plurality of colors (for example, red, green, and blue) corresponding to a plurality of the panels 109. When the projection apparatus 100 is provided with a luminance modulation panel as one of the panels 109, the image component decomposition unit 106 may extract the luminance component contained in the image input from the OSD combining unit 105.

The geometrical correction units 107 perform geometrical correction on each image component based on correction parameters specified by the control unit 101. When user operation is received by the operation receiving unit 102, the geometrical correction units 107 correct the projection position of the pixel determined as an adjustment target position to prevent pixel deviation arising from deviation of the physical attachment positions of the panels 109, and deviation of the projection position of each color component due to chromatic aberration of the optical system. The geometrical correction units 107 input the corrected image to the panel drive units 108.

The panel drive units 108 drive the panels 109 based on the image input from the geometrical correction units 107 to form an optical modulation image on the panels 109.

The panels 109 are, for example, liquid crystal panels for modulating light emitted from the light source 111 under the control of the panel drive units 108.

The light source control unit 110 controls the light source 111 based on an instruction of the control unit 101. The light source 111 is a lamp for emitting light. When light emitted by the light source 111 is modulated by the panels 109 and focused outside the projection apparatus 100 through the projection lens 112, a projected image is formed (displayed). The projection apparatus 100 includes a color separation optical system (not illustrated) between the light source 111 and the panels 109, and a color combining optical system (not illustrated) between the projection lens 112 and the panels 109.

[Example of Adjustment Image]

Figure 3A:
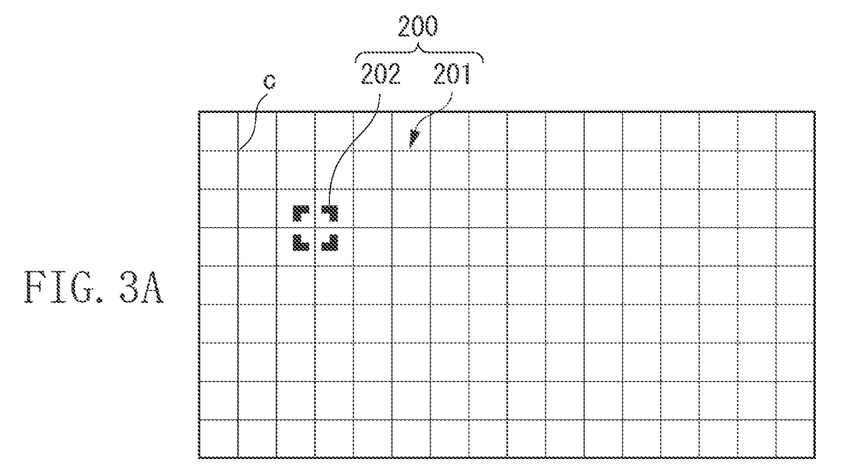
FIGS. 3A, 3B, and 3C illustrate an example of an adjustment image.
Figure 3B:
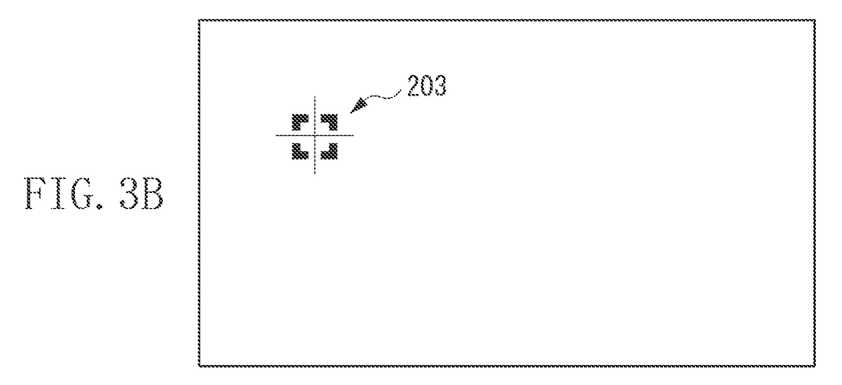
Figure 3C:
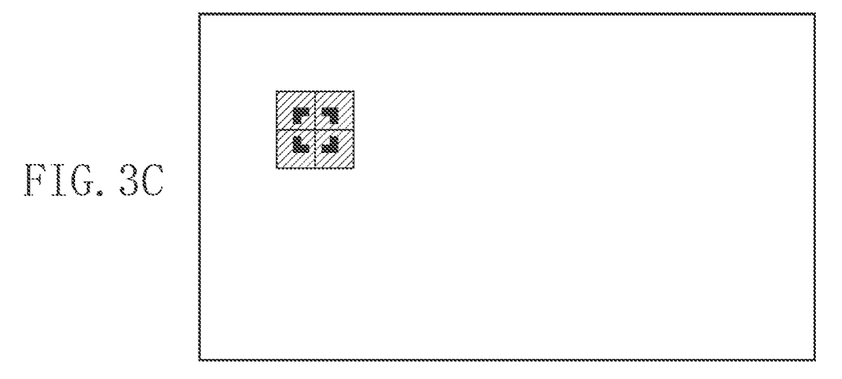

FIGS. 3A, 3B, and 3C illustrate an example of an adjustment image. The panels 109 form a first adjustment image 200 which includes a grid pattern image 201 indicating candidates of a plurality of adjustment target positions in the entire projection area, as illustrated in FIG. 3A. For example, the control unit 101 inputs the first adjustment image 200 stored in the ROM 122 to the image processing unit 101 to control the panels 109 to form the first adjustment image 200. Subsequently, the panels 109 form a second adjustment image 203 for adjusting the position to be subjected to projection of the image at the adjustment target position corresponding to the operation for determining an adjustment target position received by the operation receiving unit 102, as illustrated in FIG. 3B. Similar to the first adjustment, image, for example, the control unit 101 inputs the second adjustment image 203 stored in the ROM 122 to the image processing unit 104 to control the panels 109 to form the second adjustment image 203.

Referring to FIG. 3A, the first adjustment image 200 includes the grid pattern image 201 composed of line segments vertically and horizontally arranged at predetermined intervals, and a marker image 202. For example, the first adjustment image 200 includes a black background image, and a white grid pattern image 201 and a white marker image 202 superimposed thereon. The grid pattern image 201 composed of a plurality of quadrangular areas.

Intersections of line segments in the grid pattern image 201 are used for the adjustment of the image projection position, and referred to as adjustment control points C in the following descriptions. Referring to FIG. 3A, the top left adjustment control point (a pixel or group of pixels) to which a symbol C is assigned as an example of an adjustment control point. The control unit 101 arranges the marker image 202 at the position of any one of a plurality of adjustment control points C in the grid pattern image 201. In the initial state, for example, the control unit 101 controls the panels 109 to form the first adjustment image 200 in a state where the marker image 202 is arranged at the position of the adjustment control point C around the center of the grid pattern image 201.

When the operation receiving unit 102 receives moving of the grid pattern image 201 when the first adjustment image 200 is projected, the control unit 101 controls the panels 109 to move the marker image 202 to the adjacent adjustment control point in the direction specified by the operation. The user can select a position to be subjected to adjustment of the image projection position by repetitively moving the grid pattern image 201.

When the operation receiving unit 102 receives an operation for determining an adjustment control point C corresponding to a position to be subjected to adjustment of the image projection position, the control unit changes the adjustment image to be formed by the panels 109 from the first adjustment image 200 in FIG. 3A to the second adjustment image 203 in FIG. 3B. Based on an instruction of the control unit 101, the panels 109 form the second adjustment image 203 in the area corresponding to the adjustment control point C determined by the operation received by the operation receiving unit 102.

As illustrated in FIG. 3B, the second adjustment image 203 is projected in a smaller area range than the first adjustment image 200. For example, the panels 109 form the second adjustment image 203 in a range in which the projection position of the pixel at the adjustment target position corresponding to a determination operation received by the operation receiving unit 102 is movable. The range where the pixel at the adjustment target position is movable is within a plurality of quadrangular areas adjacent to the adjustment control point C determined by the determination operation. In other words, the range in which the pixel at the adjustment target position movable is surrounded by lines connecting a plurality of adjustment control points C closest in the vertical, horizontal, and oblique directions centering on the adjustment control point C determined by the determination operation.

FIG. 3C illustrates a range in which the user can move the pixel at the adjustment target position by using the second adjustment image 203 illustrated in FIG. 3B. The user can move the adjustment control point C to any position in the range of the shaded area shown in FIG. 3C.

Figure 4A:
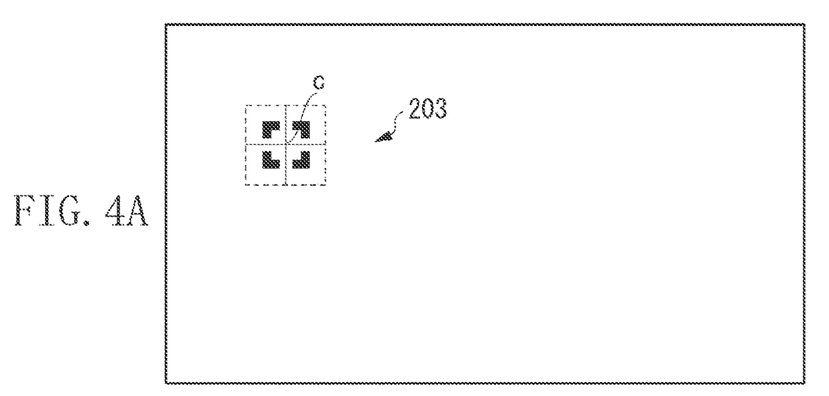
FIGS. 4A and 4B illustrate a state where a second adjustment image changes when a user moves an adjustment control point.
Figure 4B:
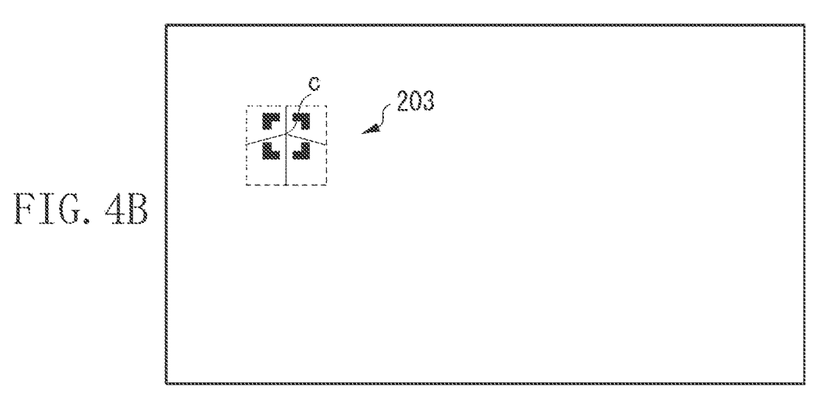

FIGS. 4A and 4B illustrate a state where the second adjustment image 203 changes when a user moves the adjustment control point C. The dashed lines in FIGS. 4A and 4B indicate a range in which the user can move the adjustment control point C. FIG. 4A illustrates a state before the user moves the adjustment control point C. FIG. 4B illustrates a state where the user moves upwardly the adjustment control point C.

The control unit 101 changes the shape of the second adjustment image 203 so that the adjustment control point C in the second adjustment image 203 is more upwardly positioned than the position illustrated in FIG. 4A to geometrically correct the projection position of pixels in the four quadrangular areas adjacent to the adjustment control point C. In other words, the adjustment control point C is a vertex of the four quadrangular areas adjacent to the adjustment control point C. Based on an instruction of the control unit 101, the panels 109 form, at a more upward position than the position illustrated in FIG. 4A, the second adjustment image 203 after deformation in response to the moving operation by the user.

In a state where the adjustment control point C is moved as illustrated in FIG. 4B, the control unit 101 moves the projection position of each pixel in the correction target range surrounded by dashed lines by the amount corresponding to the moving amount of the adjustment control point C. More specifically, the control unit 101 moves the positions of a plurality of pixels so that a plurality of pixels between the pixel at the adjustment control point C and pixels on the dashed lines is uniformly arranged between the adjustment control point C after movement and the dashed lines. More specifically, the control unit 101 moves pixels closer to the adjustment control point C by longer distances, and moves pixels closer to the dashed lines by shorter distances. The amount of movement of the pixels surrounding the adjustment control point C is represented by the inclination (deformation) of the horizontal line segments of the partial grid pattern centered on the control point C, as shown in FIG. 4B.

In the second adjustment image 203, as shown in FIG. 4B, the intersection between the vertical and the horizontal line segments is the adjustment control point C. The second adjustment image 203 includes four L-shaped patterns around the adjustment control point C at positions that do not overlap with the adjustment control point C. The second adjustment image 203 including four L-shaped patterns at positions that do not overlap with the adjustment control point C in this way allows the user to easily recognize the position of the adjustment control point C and enables preventing an image around the adjustment control point C from becoming hard to visually recognize.

The panels 109 form a plurality of the second adjustment images 203 corresponding to a plurality of color components to enable correction of color shift. To move the projection position of a pixel at a position where color shift occurs, the user can select a color component of which the projection position is to be changed and, by using the second adjustment image 203 corresponding to the selected color component, adjust the projection position of the pixel at the determined position for the selected color component.

Figure 5A:
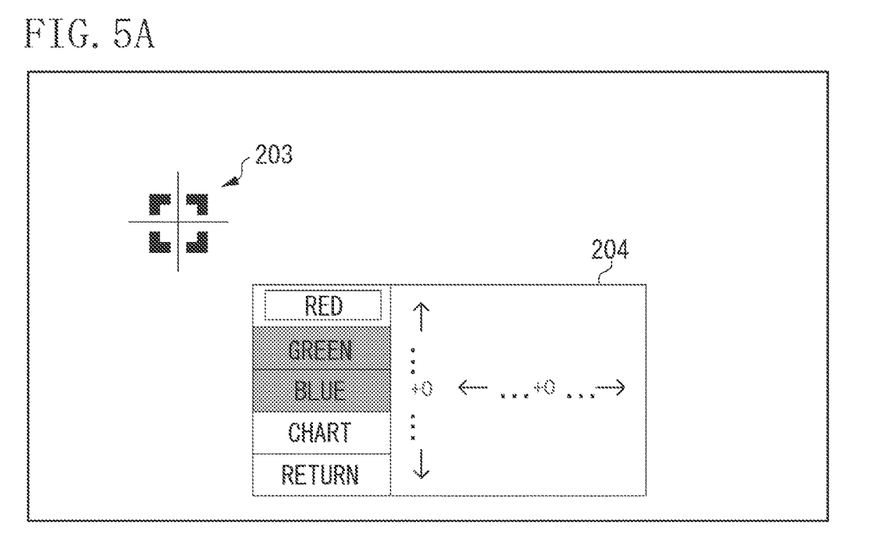
FIGS. 5A and 5B illustrate examples of screens for setting the adjustment of the projection position of a pixel for each color component.
Figure 5B:
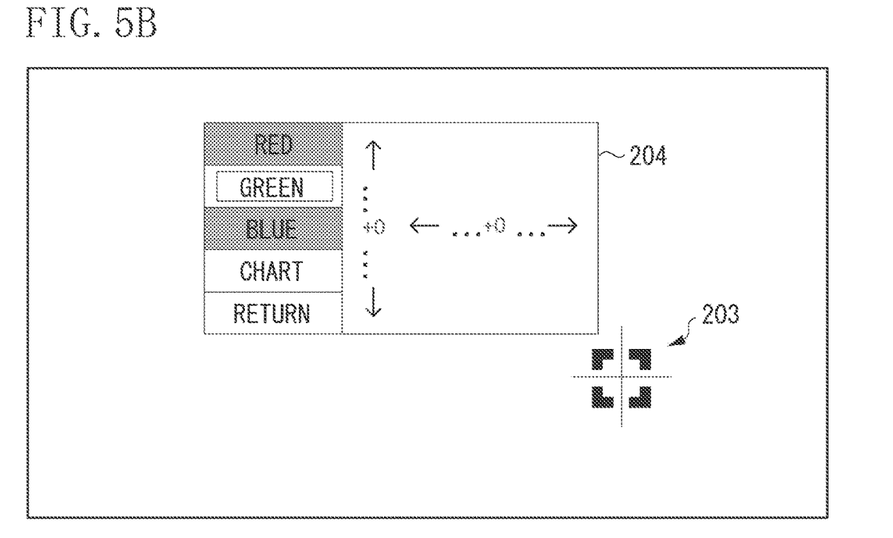

FIGS. 5A, 5B, 6A, and 6B illustrate examples of screens for setting the adjustment of the projection position of a pixel for each color component. As illustrated in FIGS. 5A and 5B, based on an instruction of the control unit 101, the panels 109 form a selection image 204 for selecting one color component from a plurality of color components at a position that does not overlap with the second adjustment image 203. As illustrated in FIGS. 5A and 5B, the panels 109 form the selection image 204 at a different position for a different adjustment target position determined by the user.

The selection image 204 includes an area for selecting an adjustment target color component (red, green, or blue), an area for selecting a chart to be used as the background image, an area for performing an operation for returning to the screen in which the first adjustment image 200 is projected, and an area for setting the adjustment amount of the adjustment control point C. In a state where the panels 109 form the selection image 204, the operation receiving unit 102 receives selection of one color component. In a state of receiving selection of a color component, the user cannot use the area for setting the adjustment amount of the adjustment control point C. In this state, as illustrated in FIGS. 5A and 5B, the panels 109 form the selection image 204 in which the characters in the area for setting the adjustment amount are changed to a color (for example, gray) indicating that the adjustment amount cannot be set.

Upon reception of selection of one color component, the operation receiving unit 102 receives input of the adjustment amount for the projection position of the selected color component. The panels 109 form the second adjustment image 203 corresponding to the one color component received by the operation receiving unit 102.

Figure 6A:
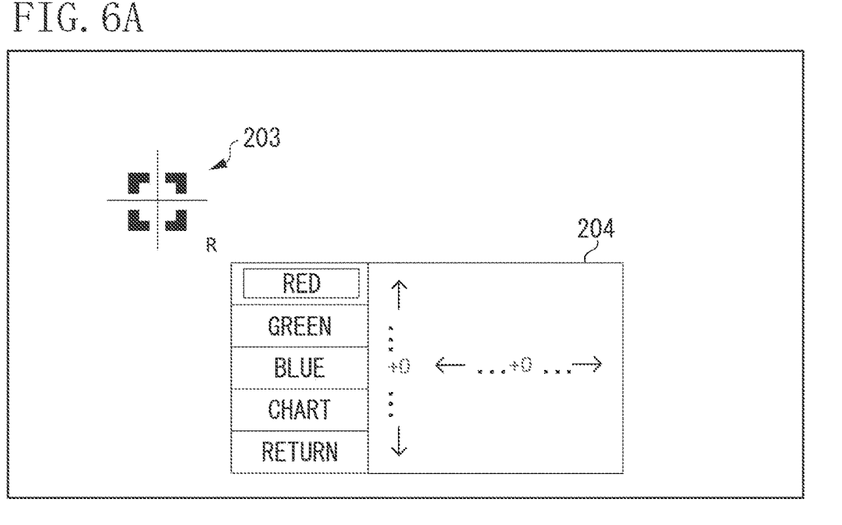
FIGS. 6A and 6B illustrate examples of screens for setting the adjustment of the projection position of pixel for each color component.
Figure 6B:
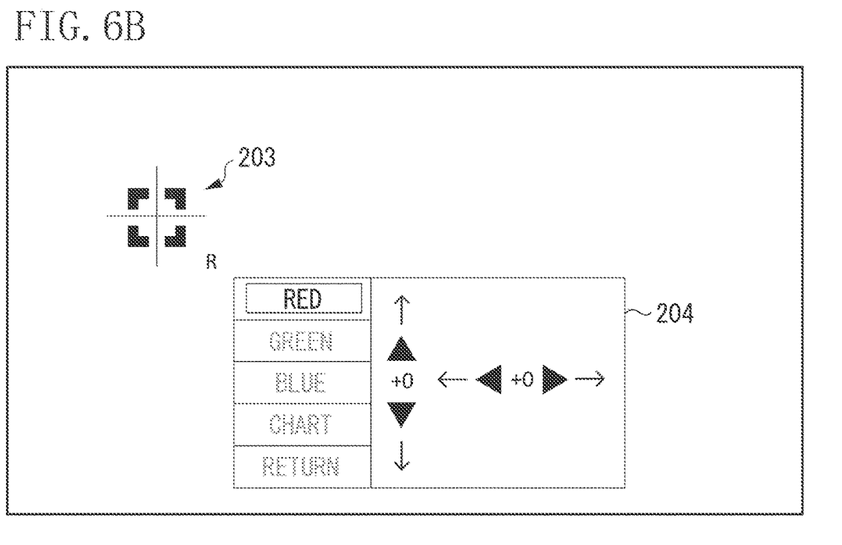

As illustrated in FIG. 6B, while the operation receiving unit 102 can receive input of the adjustment amount, the panels 109 may form the selection image 204 which indicates that the adjustment amount of the projection position of an unselected color component cannot be input (a selection image in which texts corresponding to color components other than the selected color component are lighter in color than a text corresponding to the selected color component). For example, when the operation receiving unit 102 receives selection of one color component, the control unit 101 changes the color or mode of texts and areas corresponding to color components other than the selected color component, and clearly indicates to the user that projection positions of pixels of the color components of the changed color or mode cannot be adjusted.

While the panels 109 are forming the second adjustment image 203, the panels 109 may form information indicating the color component selected as a target of the adjustment of the projection position in the selection image 204, for example, a character "R" illustrated in FIG. 6A. If the panels 109 form information indicating a color component corresponding to the second adjustment image 203 in this way, the user can easily grasp which color component is currently being adjusted.

[Flowchart of Operations of CPU 121]

Figure 7:
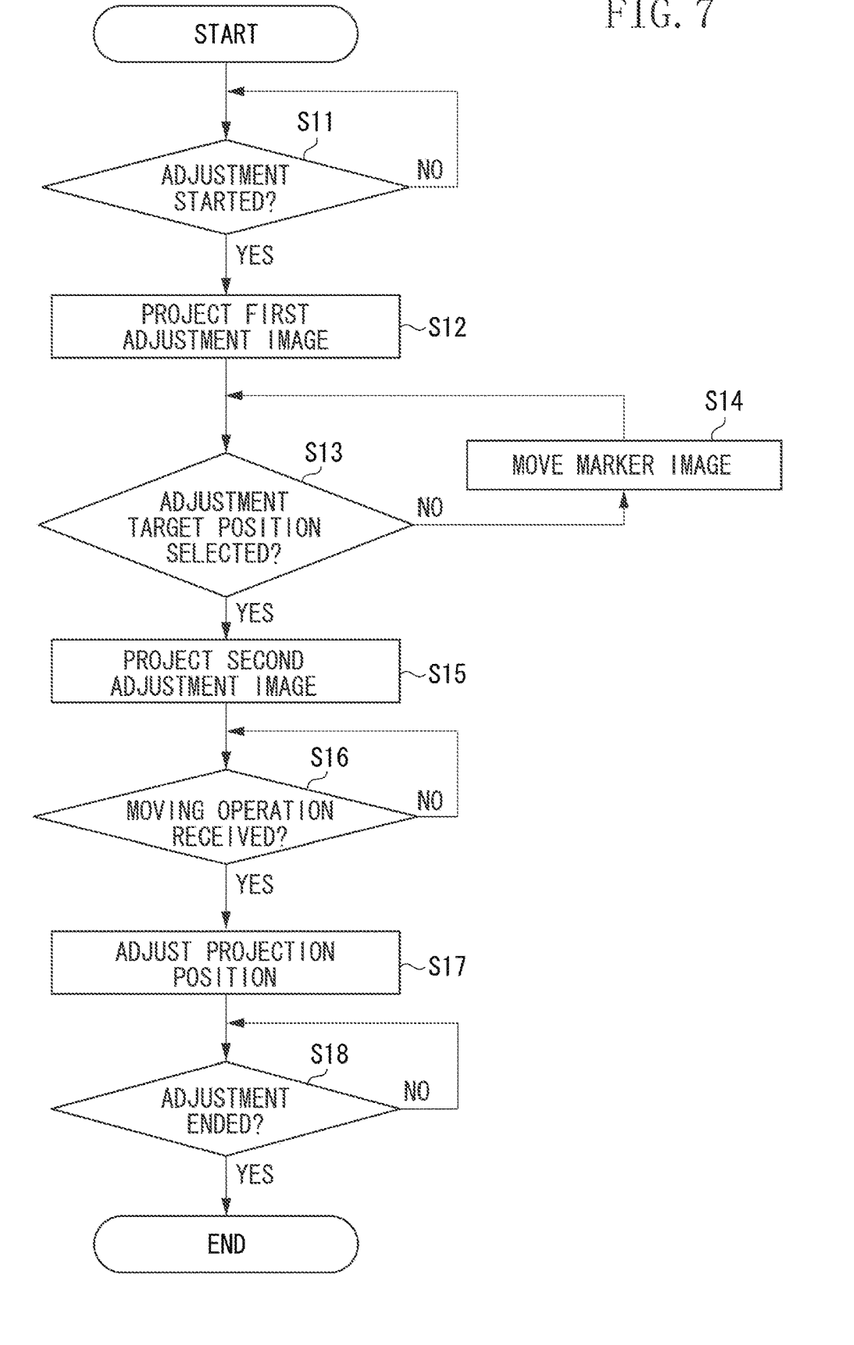
FIG. 7 is a flowchart illustrating processing operations of a central processing unit (CPU) of a projection apparatus.

FIG. 7 is a flowchart illustrating processing operations (a process or method) of the CPU 121 of the projection apparatus 100. In step S11, the CPU 121 performs monitoring to determine whether the operation receiving unit 102 has received activation of the position adjustment mode for adjusting the projection position of a pixel. When the operation receiving unit 102 does not receive activation of the position adjustment mode (NO in step S11), the CPU 121 continues monitoring.

On the other hand, when the CPU 121 detects that the operation receiving unit 102 has received activation of the position adjustment mode (YES in step S11), the processing proceeds to step S12. In step S12, the CPU 121 reads the first adjustment image 200 stored in the ROM 122. In step S12, the CPU 121 inputs the read first adjustment image 200 to the image processing unit 104 to control the panels 109 to form the first adjustment image 200.

In step S13, the CPU 121 performs monitoring to determine whether the operation receiving unit 102 receives determination of an adjustment target position while the panels 109 are forming the first adjustment image 200. When the operation receiving unit 102 does not receive determination of an adjustment target position (NO in step S13), the processing proceeds to step S14. In step S14, the CPU 121 moves the marker image 202 in response to a user operation. After the CPU 121 has moved the marker image 202, the processing returns to step S13. In step S13, the CPU 121 continues monitoring to determine whether determination of an adjustment target position has been received.

On the other hand, when the operation receiving unit 102 has received determination of an adjustment target position (YES in step S13), the processing proceeds to step S15. In step S15, the CPU 121 reads the second adjustment image 203 stored in ROM 122. In step S15, the CPU 121 inputs the read second adjustment image 203 to the image processing unit 104 to control the panels 109 to form the second adjustment image 203. In step S16, the CPU 121 performs monitoring to determine whether the operation receiving unit 102 receives moving of the adjustment control point of the second adjustment image 203 while the panels 109 are forming the second adjustment image 203.

When the operation receiving unit 102 does not receive moving of the adjustment control point of the second adjustment image 203 (NO in step S16), the CPU 121 continues monitoring. On the other hand, when the operation receiving unit 102 has received moving of the adjustment control point of the second adjustment image 203 (YES in step S16), the processing proceeds to step S17. In step S17, the CPU 121 adjusts the projection position of the pixel of an adjustable area by using the second adjustment image 203. In step S18, the CPU 121 performs monitoring to determine whether the operation receiving unit 102 has received an operation for ending the adjustment. When the operation receiving unit 102 receives an operation for ending the adjustment (YES in step S18), the CPU 121 ends the adjustment.

[Modifications]

Modes of the first and the second adjustment images are arbitrary as long as the first and the second adjustment images are different.

Figure 8A:
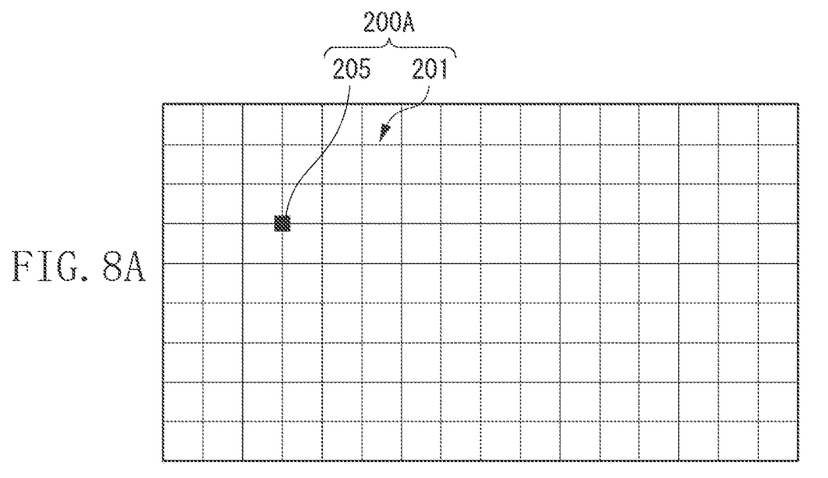
FIGS. 8A and 8B illustrate a first modification of a first and a second adjustment images.
Figure 8B:
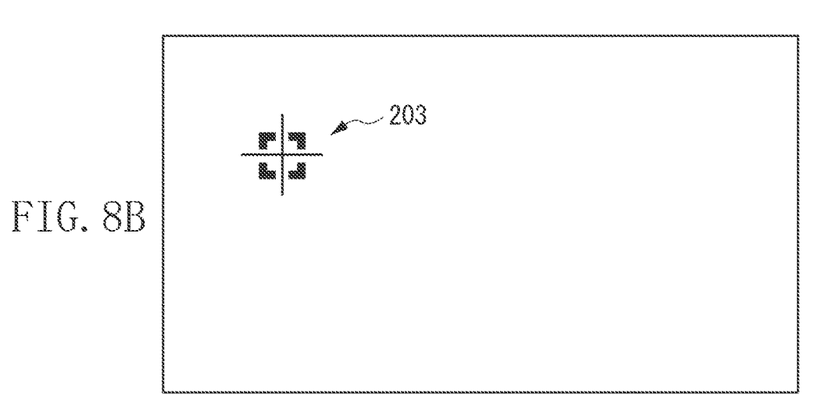

FIGS. 8A and 8B illustrate a first modification of the first and the second adjustment images. In a first adjustment image 200A illustrated in FIG. 8A, the shape of a marker image 205 is different from the shape of the marker image 202 in FIG. 3A. As illustrated in FIG. 8A, the marker image 205 may be a pattern having a shape that covers the adjustment control point C. Also in this case, when the operation receiving unit 102 receives determination of an adjustment target position, the control unit 101 controls the panels 109 to form the second adjustment image 203 as illustrated in FIG. 8B formed of a pattern that does not cover the adjustment control point C.

Figure 9A:
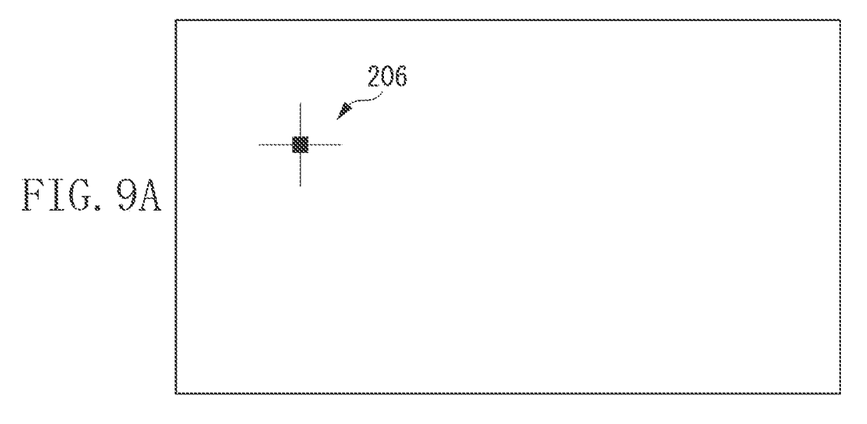
FIGS. 9A and 9B illustrate a second modification of the first and the second adjustment images.

FIGS. 9A and 9B illustrate a second modification of the first and the second adjustment images. A first adjustment image 206 illustrated in FIG. 9A differs from the first adjustment image 200 in FIG. 3A in that the grid pattern image 201 is not included. Even if the first adjustment image 206 does not include the grid pattern image 201, the adjustment control points C are arranged at predetermined intervals, and the control unit 101 moves the position of the first adjustment image 206 when a user moves the first adjustment image 206.

Figure 9B:
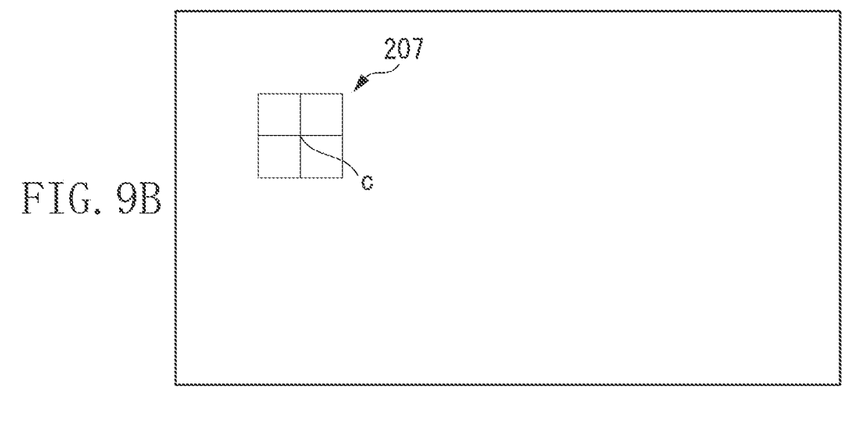

Unlike the second adjustment image 203 in FIG. 3B, a second adjustment image 207 in FIG. 9B does not include L-shaped patterns around the adjustment control point C. Instead, the second adjustment image 207 in FIG. 9B includes a quadrangle surrounding crisscross line segments passing through the adjustment control point C. The second adjustment image 207 having such a quadrangle allows the user to easily grasp an area in which the adjustment control point C is movable.

Figure 10A:
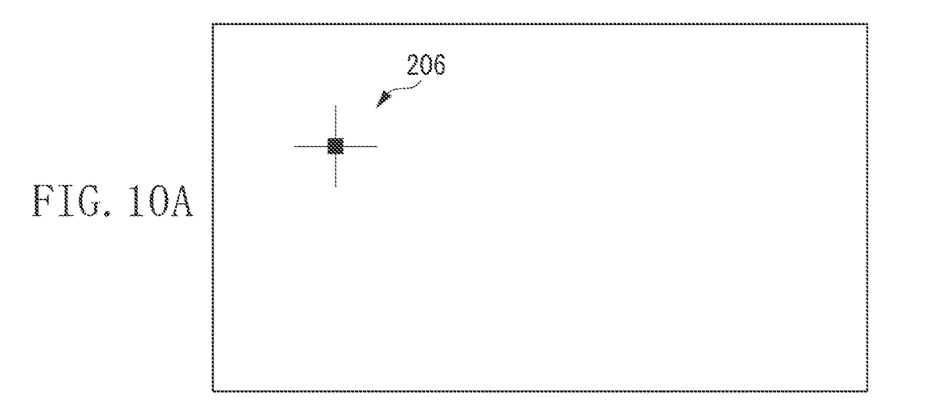
FIGS. 10A and 10B illustrate a third modification of the first and the second adjustment images.
Figure 10B:
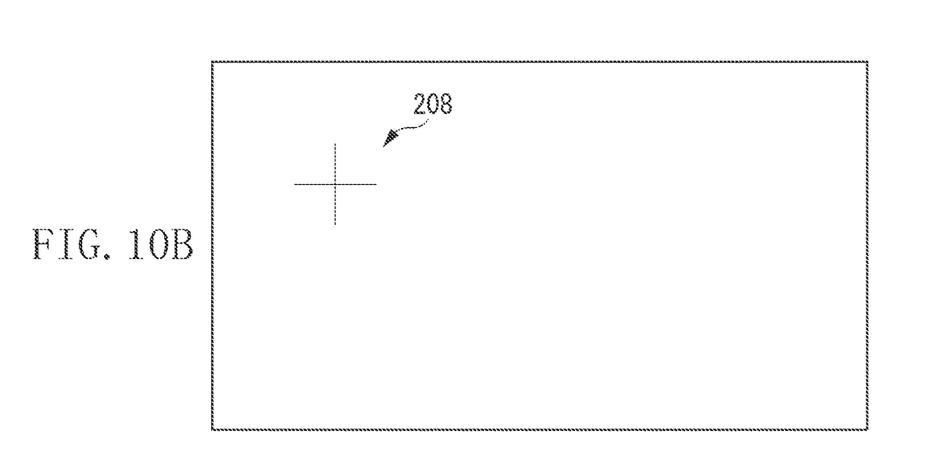

FIGS. 10A and 10B illustrate a third modification of the first and the second adjustment images. A first adjustment image 206 in FIG. 10A is identical to the first adjustment image 206 in FIG. 9A. A second adjustment image 208 in FIG. 10B is formed by removing the quadrangle arranged to cover the adjustment control point C from the first adjustment image 206 in FIG. 10A. The control unit 101 may control the panels 109 to form the second adjustment image 208 generated by deleting in this way an image portion included in the first adjustment image 206.

[Effects of Projection Apparatus 100]

As described above, in a mode for adjusting an image formed by the panels 109, the control unit 101 controls the panels 109 to form a first adjustment image for selecting a position to be subjected to image adjustment. Then, when the operation receiving unit 102 receives an operation for determining an adjustment target position while the panels 109 are forming the first adjustment image, the control unit 101 controls the panels 109 to form a second adjustment image different from the first adjustment image.

In this manner, when the user selects an adjustment target position, the projection apparatus 100 projects a first adjustment image suitable for the selection operation. When the user finely adjusts the projection position of the pixel at the adjustment target position determined as an adjustment candidate, the projection apparatus 100 projects a second adjustment image which makes it easier to visually recognize the vicinity of the adjustment control point and is suitable for fine adjustment, thus improving user operability.

The difference between the first and the second adjustment images allows the user to easily grasp whether selection of an adjustment target position is possible or whether the projection position of the pixel at the adjustment target position can be finely adjusted.

The present invention has been described above based on some exemplary embodiments. A new exemplary embodiment arising from an arbitrary combination of these exemplary embodiments is also included in the exemplary embodiments of the present invention. Effects of the new exemplary embodiment include effects of the original exemplary embodiments. Further, the technical scope of the present invention is not limited to the scope of the above-described exemplary embodiments but can be modified in diverse ways within the ambit of the appended claims.

Although, in the above-described examples, the projection apparatus 100 projects a second adjustment image to be used to adjust the image projection position, applications of the second adjustment image are not limited to the adjustment of the image projection position. The second adjustment, image may be used for other applications including the adjustment of the chromaticity or luminance of an image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-001617, filed Jan. 10, 2017, which is hereby incorporated by reference herein in its entirety.

What is claimed is:
1. A projection apparatus comprising:
a projection unit configured to project an image;

an operation receiving unit configured to receive an operation; and a control unit configured to control the projection unit, wherein the control unit controls the projection unit to project a first adjustment image for indicating a plurality of adjustment positions in an image to be projected by the projection unit and selecting an adjustment target position from the plurality of adjustment positions, wherein, when the operation receiving unit receives an operation for determining the adjustment target position while the projection unit is projecting the first adjustment image, the control unit controls the projection unit to project a second adjustment image for adjusting a position at which an image corresponding to the adjustment target position is projected in an area corresponding to the adjustment target position selected by the determination operation received by the operation receiving unit, and wherein, in the second adjustment image, an image indicating an adjustment position different from the adjustment target position is different from an image indicating the plurality of adjustment positions in the first adjustment image so that the selected adjustment target position is visually recognized.

2. The projection apparatus according to claim 1, wherein the control unit controls the projection unit to project the second adjustment image in a smaller range than the first adjustment image.

3. The projection apparatus according to claim 1, wherein the control unit controls the projection unit to project the second adjustment image in a range where a position at which an image corresponding to the selected adjustment target position is projected is movable.

4. The projection apparatus according to claim 1, wherein the second adjustment image is an image for adjusting a position at which the image corresponding to the selected adjustment target position is projected, in a range of a plurality of quadrangular areas adjacent to the selected adjustment target position.

5. The projection apparatus according to claim 1, wherein the control unit controls the projection unit to project a plurality of the second adjustment images corresponding to a plurality of color components.

6. The projection apparatus according to claim 5, wherein the control unit controls the projection unit to project an image for selecting one color component from among the plurality of color components, at a position that does not overlap with the second adjustment images.

7. The projection apparatus according to claim 6, wherein the operation receiving unit receives selection of the one color component while the selection image is being projected, and wherein the control unit controls the projection unit to project the second adjustment image corresponding to the one color component received by the operation receiving unit.

8. The projection apparatus according to claim 7, wherein, upon reception of selection of the one color component, the operation receiving unit receives input of an adjustment amount of a projection position of the one color component of an image at the selected adjustment target position, and wherein, while the operation receiving unit can receive the input of the adjustment amount, the control unit controls the projection unit to project the selection image indicating that an adjustment amount of a projection position of an unselected color component cannot be input.

9. The projection apparatus according to claim 5, wherein, while the second adjustment image is being projected, the control unit controls the projection unit to project information indicating a color component selected as an adjustment target.

10. The projection apparatus according to claim 1, further comprising a storage unit configured to store the second adjustment image, wherein, upon reception of determination of the adjustment target position, the operation receiving unit receives selection of whether to project the second adjustment image stored in the storage unit or to project an image input from outside with the second adjustment image superimposed thereon.

11. The projection apparatus according to claim 1, wherein the second adjustment image does not include the image indicating the adjustment positions different from the selected adjustment target position.

12. The projection apparatus according to claim 1, wherein the second adjustment image is projected in a smaller area range than the first adjustment image, and wherein the second adjustment image does not include the plurality of adjustment positions other than the selected adjustment target position.

13. The projection apparatus according to claim 1, wherein the first adjustment image includes a pattern for indicating the plurality of adjustment positions in an image to be projected by the projection unit and selecting the adjustment target position from the plurality of adjustment positions, and wherein the second adjustment image is projected in a smaller area range than the first adjustment image, such that the second adjustment image includes part of the pattern for indicating the selected adjustment target position and a range of movement of the selected adjustment target position.

14. A control method for a projection apparatus, comprising:

controlling a projection unit to project a first adjustment image for indicating a plurality of adjustment positions in an image to be projected by the projection unit and selecting an adjustment target position from the plurality of adjustment positions;

receiving an operation for determining the adjustment target position while the projection unit is projecting the first adjustment image; and controlling the projection unit, upon reception of the determination operation, to project a second adjustment image in which an image indicating an adjustment position different from the adjustment target position is different from an image indicating the plurality of adjustment positions in the first adjustment image so that the selected adjustment target position is visually recognized in an area corresponding to the adjustment target position.

* * * * *